(12) United States Patent
Jacobs et al.

(10) Patent No.: US 7,293,073 B2
(45) Date of Patent: *Nov. 6, 2007

(54) EXACTLY ONCE CACHE FRAMEWORK

(75) Inventors: Dean Bernard Jacobs, Berkeley, CA (US); Eric M. Halpern, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/887,690

(22) Filed: Jul. 8, 2004

(65) Prior Publication Data

US 2004/0243585 A1 Dec. 2, 2004

Related U.S. Application Data

(63) Continuation of application No. 10/234,693, filed on Sep. 4, 2002, now Pat. No. 6,826,601.

(60) Provisional application No. 60/317,718, filed on Sep. 6, 2001.

(51) Int. Cl.
 *G06F 13/14* (2006.01)
(52) U.S. Cl. .................................. 709/217
(58) Field of Classification Search ............ 709/213, 709/214, 216, 217; 711/113
 See application file for complete search history.

(56) References Cited

U.S. PATENT DOCUMENTS

| 4,714,996 A | 12/1987 | Gladney ............ 707/203 |
| 5,163,148 A | 11/1992 | Walls ............... 707/204 |
| 5,613,060 A | 3/1997 | Britton ............. 714/15 |
| 5,765,171 A | 6/1998 | Gehani ............. 707/203 |
| 5,796,934 A | 8/1998 | Bhanot et al. |
| 5,805,798 A | 9/1998 | Kearns ............. 714/48 |
| 5,909,689 A | 6/1999 | Van Ryzin ......... 707/203 |
| 6,018,805 A | 1/2000 | Ma .................. 714/4 |
| 6,122,629 A * | 9/2000 | Walker et al. ....... 707/8 |
| 6,134,673 A | 10/2000 | Chrabaszcz |
| 6,212,521 B1 | 4/2001 | Minami ............. 707/10 |
| 6,389,462 B1 * | 5/2002 | Cohen et al. ....... 709/218 |
| 6,425,005 B1 | 7/2002 | Dugan .............. 709/223 |
| 6,438,705 B1 | 8/2002 | Chao ............... 714/4 |
| 6,505,200 B1 | 1/2003 | Ims et al. |
| 6,505,241 B2 * | 1/2003 | Pitts ................ 709/218 |

(Continued)

OTHER PUBLICATIONS

BEA System, WebLogic Server 6.1, Sep. 13, 2001.

(Continued)

*Primary Examiner*—Kevin L. Ellis
(74) *Attorney, Agent, or Firm*—Fliesler Meyer LLP

(57) ABSTRACT

A system for managing objects in a clustered network includes a file system containing at least one copy of a data object. The system can include several clustered servers in communication with the file system. A distributed consensus algorithm is used to select a host server. The selected host server can contain a copy of the data object, such as in local cache, providing access to the local copy to any other server in the cluster. Any change made to an item hosted by the host server can also be updated in the file system. If the host server becomes unable to host the object, a new host can be chosen using the distributed consensus algorithm. The other servers are then notified of the new host by multicast messaging.

9 Claims, 7 Drawing Sheets

U.S. PATENT DOCUMENTS

| | | | |
|---|---|---|---|
| 6,523,130 B1 | 2/2003 | Hickman | 714/4 |
| 6,526,521 B1 | 2/2003 | Lim | |
| 6,539,381 B1 | 3/2003 | Prasad et al. | |
| 6,578,160 B1 | 6/2003 | MacHardy, Jr. et al. | |
| 6,721,777 B1 | 4/2004 | Sharma | 718/101 |
| 6,757,708 B1 | 6/2004 | Craig et al. | |
| 6,775,703 B1 | 8/2004 | Burns | 709/228 |
| 6,779,017 B1 | 8/2004 | Lamberton | 709/203 |
| 6,826,601 B2* | 11/2004 | Jacobs et al. | 709/217 |
| 6,832,238 B1 | 12/2004 | Sharma | 709/201 |
| 6,877,111 B2 | 4/2005 | Sharma et al. | |
| 6,944,785 B2 | 9/2005 | Gadir | 714/4 |
| 6,963,857 B1 | 11/2005 | Johnson | 705/39 |
| 7,100,195 B1 | 8/2006 | Underwood | 726/2 |
| 7,171,692 B1 | 1/2007 | DeMello | 726/26 |
| 2001/0042073 A1 | 11/2001 | Saether et al. | |
| 2001/0054062 A1 | 12/2001 | Ismael et al. | |
| 2002/0073188 A1 | 6/2002 | Rawson | |
| 2002/0073354 A1 | 6/2002 | Schroiff et al. | |
| 2002/0147961 A1 | 10/2002 | Charters | |
| 2002/0161839 A1 | 10/2002 | Colasurdo et al. | |
| 2002/0188591 A1 | 12/2002 | Santosuoss | |
| 2003/0041135 A1 | 2/2003 | Keyes et al. | |
| 2003/0060214 A1 | 3/2003 | Hendrey et al. | |
| 2003/0065686 A1 | 4/2003 | Callahan et al. | |
| 2003/0088713 A1 | 5/2003 | Mandal et al. | |
| 2003/0233433 A1 | 12/2003 | Halpern | |
| 2003/0236923 A1 | 12/2003 | Jeyaraman | |
| 2004/0059735 A1 | 3/2004 | Gold et al. | |
| 2004/0139125 A1 | 7/2004 | Strassburg et al. | |
| 2004/0153558 A1 | 8/2004 | Gunduc et al. | |
| 2004/0230747 A1 | 11/2004 | Ims et al. | |
| 2006/0168118 A1* | 7/2006 | Godlin et al. | 709/218 |
| 2006/0212453 A1 | 9/2006 | Eshel et al. | |

OTHER PUBLICATIONS

Visveswaran, "Dive into connection pooling with J2EE," Oct. 2000, pp. 1-7.
Stearns, B., "Using the J2EE Connector Architecture Common Client Interface," Sun Systems, Apr. 2001, pp. 1-10.
Marinescu, F., "BEA Weblogic Server 6.1 has been released," TheServerSide.com, p. 1.
Flowers, B., "The J2EE Connector Architecture," Sys-Con Media, May 1, 2001, pp. 1-4.
Rana, A., et al., "Java Junction," Intelligent Enterprise, Apr. 16, 2001, pp. 1-9.
Stanhope, J., "J2EE Connector Architecture Promises to Simplify Connection to Back-End Systems," Giga Information Group, Nov. 16, 2000, pp. 1-4.
Sarathy, V., et al., "Integrating Java Applications with the Enterprise," EAI Journal, May 2001, pp. 50-55.
Rodoni, J., "The J2EE Connector Architecture's Resource Adapter," Sun Systems, Dec. 2001, pp. 1-12.
Newport, Billy, JMX, 2001, http://www.theserverside.com/articles/article.tss?1=JMX.
Kooijmans, Enterprise JavaBeans for z/OS and OS/390 WebSphere Applications Server V4.0; 2001, p. 31-78, 185-240.
Bainbridge, "CICS and Enterprise JavaBeans," 2001, v. 40, No. 1, p. 1-19.

* cited by examiner

1

EXACTLY ONCE CACHE FRAMEWORK

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following U.S. Patent Applications are cross-referenced and incorporated herein by reference:

U.S. patent application Ser. No. 60/305,986 entitled "DATA REPLICATION PROTOCOL," by Dean Bernard Jacobs, Reto Kramer, and Ananthan Bala Srinivasan, filed Jul. 16, 2001.

U.S. patent application Ser. No. 60/317,566 entitled "EXACTLY ONCE JMS COMMUNICATION" by Dean Bernard Jacobs and Eric Halpern, filed Sep. 6, 2001.

TECHNICAL FIELD

The present invention is related to technology for distributing objects among servers in a network cluster.

BACKGROUND

In distributed computer systems, it is often the case that several servers and/or networking nodes need to work together. These servers and nodes have to be coordinated, as there is typically networking information that needs to be shared among the machines in order to allow them to function as a single entity. Typical approaches to machine coordination can be very expensive in terms of resources and efficiency.

In general, some synchronization is required for the nodes to agree, as there may be several messages passing between the nodes. This requirement for synchronization may, however, be undesirable in a clustered networking environment. Many clustered environments simply avoid imposing any such synchronization requirement. There are applications, however, where agreement is necessary.

In one case where agreement is needed, a device can exist to which a cluster may want exclusive access. One such device is a transaction log on a file system. Whenever a transaction is in progress, there are certain objects that need to be saved in a persistent way, such that if a failure occurs those persistently-saved objects can be recovered.

For these objects that need to be saved in one place, there is typically a transaction monitor that runs on each server in that cluster or domain, which then uses a local file system to access the object. Each server can have its own transaction manager such that there is little to no problem with persistence. There is then also no need for coordination, as each server has its own transaction manager.

For example, there can be a cluster including three servers, each server having a transaction manager. One of those servers can experience a failure or other problem causing the server to be unavailable to the cluster. Because the failed server is the only server having access to a particular transaction log, none of the transactions in that particular log can be recovered until the server is again available to the cluster.

Recovery of the log can be difficult or at least inefficient, as a problem with the server can take a significant amount of time to fix. Significant server problems can include such occurrences as the shorting out of a motherboard on the server or a power supply being burnt out.

BRIEF SUMMARY

The present invention includes a system for managing objects, such as can be stored in servers on a network or in a cluster. The system includes a data source, application, or service, such as a file system or Java Message Service component, which can be located inside or outside of a cluster. The system can include several servers in communication with the file system or application, such as through a high-speed network connection.

The system includes a lead server, such as can be agreed upon by the other servers. The lead server can be contained in a hardware cluster or in a software cluster. The system can include an algorithm for selecting a lead server from among the servers, such as an algorithm built into a hardware cluster machine. The lead server in turn will contain a distributed consensus algorithm for selecting a host server, such as a Paxos algorithm. The algorithm used for selecting the lead server can be different from, or the same as, the algorithm used to select the host server.

The host server can contain a copy of the item or object, such as can be stored in local cache. The host server can provide local copy access to any server on the network or in a cluster. The host server can also provide the only access point to an object stored in a file system, or the only access point to an application or service. Any change made to an item cached, hosted, or owned by the host server can also be updated in the file system, application, or service.

If the host server becomes unable to host the object, a new host can be chosen using a distributed consensus algorithm. The new host can then pull the necessary data for the object from the file system or service. The other servers in the cluster can be notified that a new server is hosting the object. The servers can be notified by any appropriate means, such as by point-to-point connections or by multicasting.

DETAILED DESCRIPTION

Systems in accordance with the present invention can provide solutions to availability issues, such as when a server owning a data object becomes unavailable to a server cluster. One such solution allows for another server in the cluster to take over the ownership of the data object. A problem arises, however, in making the data object accessible to both servers without having to replicate the data object on both.

If a file system, data store, or database (all collectively referred to hereinafter as "file system") is used by the cluster to persistently store data, and the file system is accessible from more than one server, the second server can automatically take over the task of data object access if the first server owning that object encounters a problem. Alternatively, there can be an algorithm utilized by the cluster or a server in the cluster to instruct a server to take ownership of the item. Another fundamental problem, however, involves getting the cluster to agree on which server now owns the resource or object, or achieving a "consensus" amongst the servers.

Figure 1:
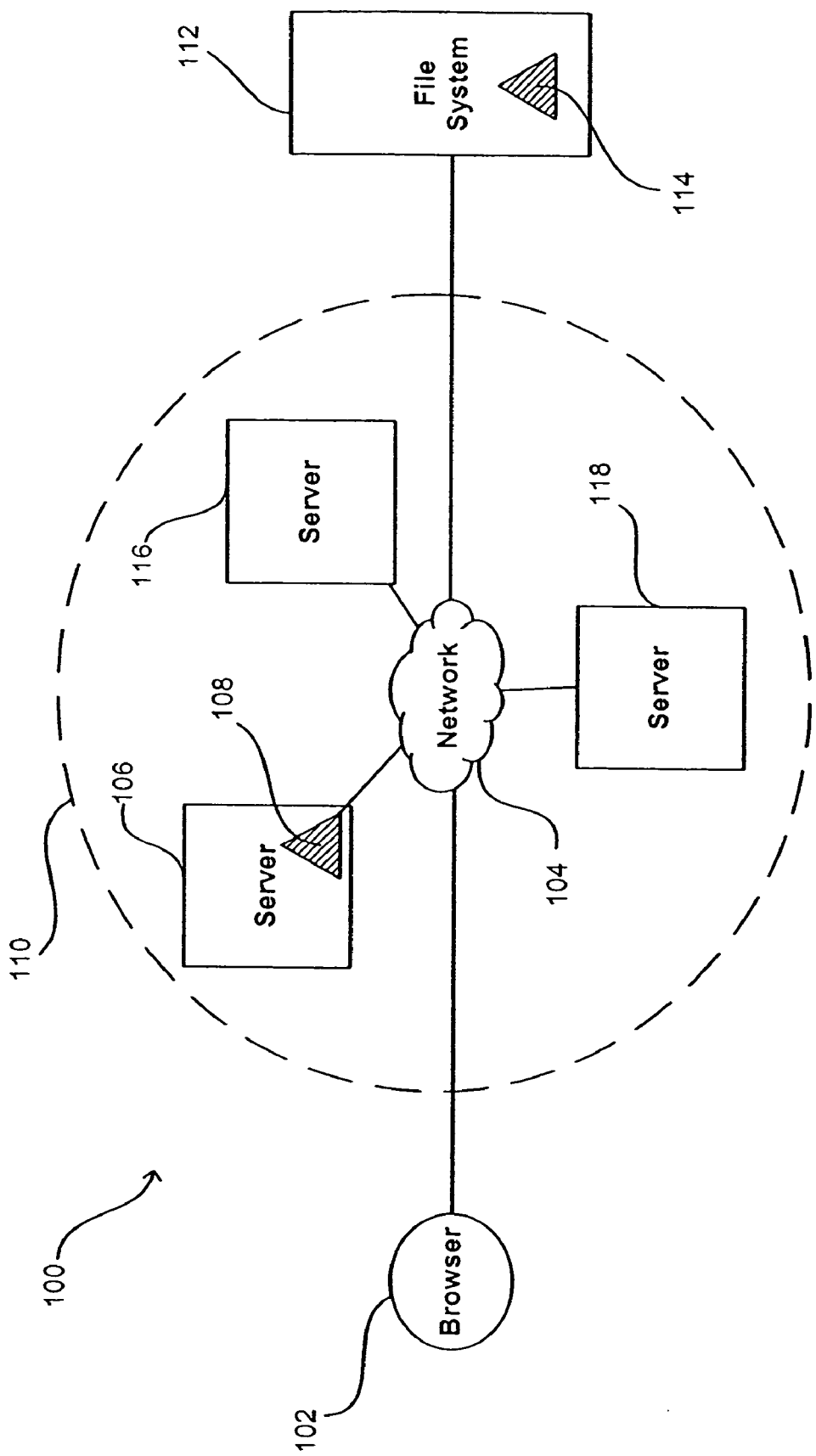
FIG. 1 is a diagram of a distributed object system in accordance with one embodiment of the present invention.

FIG. 1 shows one example of a cluster system 100 in accordance with the present invention, where an object such as a transaction log 114 is stored in a file system 112. The file system 112 is accessible to all servers 106, 116, 118 in the cluster 110, but only one of these servers can access the log 114 at a time. A host server 106 among the servers in the cluster 110 will "own" or "host" the log 114, such as by storing a copy 108 of the log 114 or by providing all access to the log 114 in the file system 112. Any other server 116, 118 in the cluster 110 can access the copy 108 of the log, and/or can access the log 114 through the hosting server 106. For example, a client or browser 102 can make a request to a network 104 that is directed to server 116 in cluster 110. That server can access the copy 108 of the transaction log on the host server 106 through the network 104. If the transaction log needs to be updated, the copy 108 can be updated along with the original log 114 on the file system 112.

A server can "own" or "host" a data object when, for example, it acts as a repository for the object, such as by storing a copy of the data object in local cache and making that copy available to other servers in the cluster, or by being the sole server having direct access to an object in a file system, service, or application, such that all other servers in the cluster must access that object through the hosting server. This ensures that an object exists "exactly once" in the server cluster.

Figure 3:
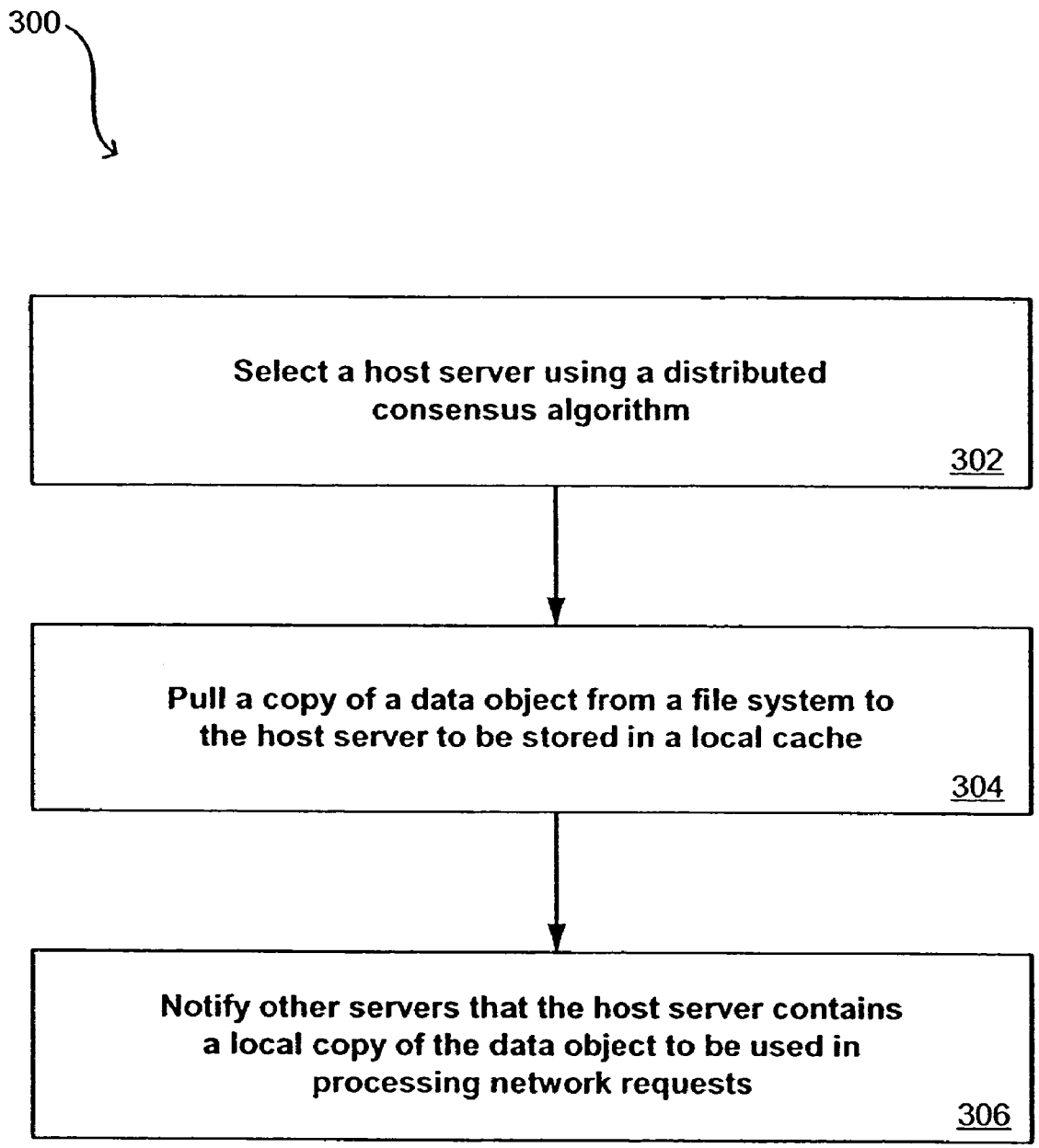
FIG. 3 is a flowchart of a method for selecting a host server in accordance with the present invention.

FIG. 3 shows one process 300 that can be used to establish the hosting of an object. A host server can be selected using a distributed consensus algorithm 302, such as a Paxos algorithm. Such an algorithm is referred to as a "distributed consensus" algorithm because servers in a cluster must generally agree, or come to a consensus, as to how to distribute objects amongst the cluster servers.

If a hosted object is, for example, to be cached on the hosting server, a copy of the data object can be pulled from a file system to the host server and stored as an object in local cache 304. The other servers on the network or in the appropriate cluster are then notified, such as by the hosting server, that a local copy of the object exists on the hosting server, and that the local copy should be used in processing future network requests 306.

In a Paxos algorithm, one example of a distributed consensus algorithm, a server can be selected to act as a host or lead server by a network server, the network server leading a series of "consensus rounds." In each of these consensus rounds, a new host or lead server is proposed. Rounds continue until one of the proposed servers is accepted by a majority or quorum of the servers. Any server can propose a host or lead server by initiating a round, although a system can be configured such that a lead server always initiates a round for a host server selection. Rounds for different selections can be carried out at the same time. Therefore, a round selection can be identified by a round number or pair of values, such as a pair with one value referring to the round and one value referring to the server leading the round.

The steps for one such round are as follows, although other steps and/or approaches may be appropriate for certain situations or applications. First, a round can be initiated by a leader sending a "collect" message to other servers in the cluster. A collect message collects information from servers in the cluster regarding previously conducted rounds in which those servers participated. If there have been previous consensus rounds for this particular selection process, the collect message also informs the servers not to commit selections from previous rounds. Once the leader has gathered responses from at least half of the cluster servers, for example, the leader can decide the value to propose for the next round and send this proposal to the cluster servers as a "begin" message. In order for the leader to choose a value to propose in this approach, it is necessary to receive the initial value information from the servers.

Once a server receives a begin message from the leader, it can respond by sending an "accept" message, stating that the server accepts the proposed host/lead server. If the leader receives accept messages from a majority or quorum of servers, the leader sets its output value to the value proposed in the round. If the leader does not receive majority or quorum acceptance ("consensus") within a specified period of time, the leader can begin a new round. If the leader receives consensus, the leader can notify the cluster or network servers that the servers should commit to the chosen server. This notification can be broadcast to the network servers by any appropriate broadcasting technology, such as through point-to-point connections or multicasting.

The agreement condition of the consensus approach can be guaranteed by proposing selections that utilize information about previous rounds. This information can be required to come from at least a majority of the network servers, so that for any two rounds there is at least one server that participated in both rounds.

The leader can choose a value for the new round by asking each server for the number of the latest round in which the server accepted a value, possibly also asking for the accepted value. Once the leader gets this information from a majority or quorum of the servers, it can choose a value for the new round that is equal to the value of the latest round among the responses. The leader can also choose an initial value if none of the servers were involved in a previous round. If the leader receives a response that the last accepted round is x, for example, and the current round is y, the server can imply that no round between x and y would be accepted, in order to maintain consistency.

A sample interaction between a round leader and a network server involves the following messages:

(1) "Collect" —a message is sent to the servers that a new round "r" is starting. The message can take the form of m=("Collect", r).

(2) "Last" —a message is sent to the leader from a network server providing the last round accepted, "a", and the value of that round, "v". The message can take the form of m=("Last", r, a, v).

(3) "Begin" —a message is sent to the servers announcing the value for round r. The message can take the form of m=("Begin", r, v).

(4) "Accept" —a message is sent to the leader from the servers accepting the value for round r. The message can take the form of m=("Accept", r).

(5) "Success" —a message is sent to the servers announcing the selection of value v for round r. The message can take the form of m=("Success", r, v).

(6) "Ack" —a message is sent to the leader from a server acknowledging that the server received the decision for round r. The message can take the form of m=("Ack", r).

There can be a file system that is separated from the servers, located either inside or outside of a hardware or software cluster. This file system can persistently store the transaction log, such as by storing the log on a first disk and replicating the log to a second disk within the file system. If the first disk crashes, the file system can hide the crash from the cluster and/or server and get the log information from the second disk. The file system can also choose to replicate the log to a third disk, which can serve as a backup to the second disk.

From the perspective of a server in the cluster, the file system can be a single resource. In one embodiment, the server may only care that a single server owns the file system at any time.

Another example of a system in accordance with the present invention involves caching in a server cluster. It may be desirable in a clustered environment, such as for reasons of network performance, to have a single cache represent a data object to servers in the cluster. Keeping items in a single cache can be advantageous, as servers in the cluster can access the cache without needing to continually return to persistent storage. Being able to pull an item already in memory can greatly increase the efficiency of such a system, as hits to a database or file system can be relatively time intensive.

One problem with a single cache, however, is that it may be necessary to ensure that the object stored in memory is the same as that which is stored on a disk of the file system. One reason for requiring such consistency is to ensure that any operations or calculations done on a cached item produce the correct result. Another reason is that it can be necessary to restore the cache from the file system in the event that the cache crashes or becomes otherwise tainted or unavailable.

There can be at least two primary ways to handle this type of caching in a cluster, although other ways may work at least as well for certain applications. One way is to replicate the cache in multiple places. This approach can be problematic, as any change to an item being cached requires that all servers replicating the cache agree to, or are at least aware of, the change. This can prove to be very expensive in terms of resources and performance.

An alternative approach in accordance with the present invention assigns a particular server to be the owner of a cache in the cluster, and all access to the cache goes through that particular server. Any server in a cluster can host such a cache. Each server can host one, several, or no caches. The caches can be hosted on a single server, or spread out among some or all of the servers in the cluster. The cluster itself can be any appropriate cluster, such as a hardware cluster or a group of servers designated by a software application to be in a given "software" cluster.

It may be possible to think of either example, a transaction log and/or a cache, as a type of object that sits somewhere on a system. It may be desirable to ensure that any such object exists only once in a cluster, and that the object is always available. It may also be desirable to ensure that the object can be recovered on another server if the server hosting the object fails, and that the object will be available to the cluster.

Figure 4:
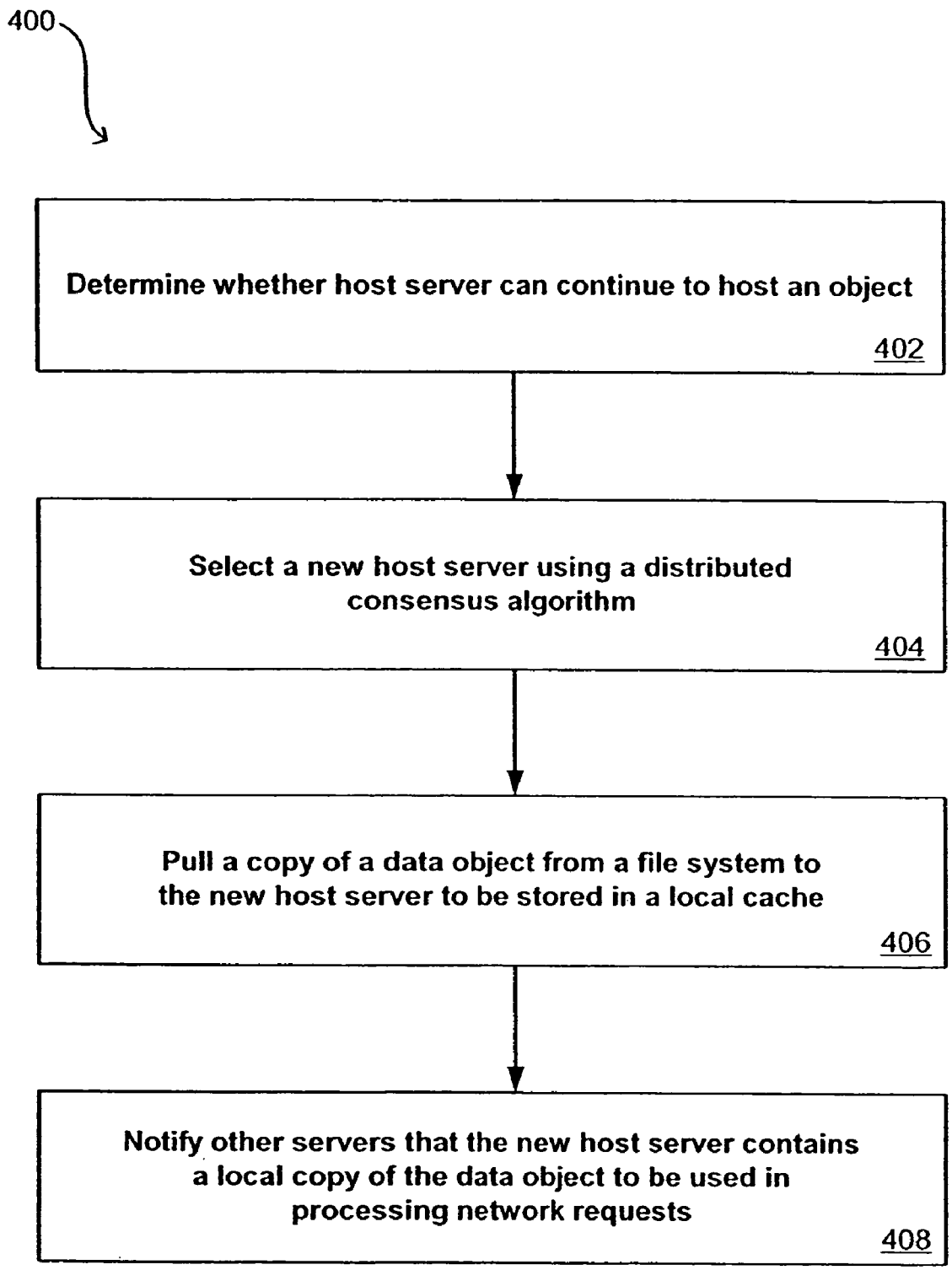
FIG. 4 is a flowchart of a method for selecting a new host server in accordance with the present invention.

One method 400 for recovery is shown in FIG. 4. In this method, a determination is made whether the host server can continue to host an object 402, such as whether the server is still available to the network. If not, a new host is selected using a distributed consensus algorithm. This selection may be performed according to the method used to select the original host 404. A copy of the data object is pulled from a file system to the new host, and can be stored in a local cache 406. The other servers on the network or in the appropriate cluster are notified that the new host server contains a local copy of the object, and that the local copy should be used in processing any future network requests 408.

Systems and methods in accordance with the present invention can define objects that exist in exactly one place in a cluster, and can ensure that those objects always exist. From a server's perspective, it may not matter whether an object such as a transaction log is mirrored or replicated, such as by a file system. From the server's perspective, there is always one persistent storage accessible by any server in the cluster. The system can periodically check for the existence of an object, or may assign ownership of objects for short periods of time such that an object will be reassigned frequently to ensure existence on some machine on the network or in the cluster.

A hardware cluster can comprise a bank of machines, each machine being capable of running multiple servers. There can also be a file system behind each machine. Servers in a hardware cluster are typically hardwired, such that they are able to more quickly make decisions and deal with server faults within the hardware cluster. Hardware clusters can be limited in size to the physical hardware of the machine containing the servers. Servers in a hardware cluster can be used as servers in a software cluster, and can also comprise network servers, as the individual servers on the machines are available to the network.

The shared file system for one of these machines can be available to all servers in a cluster, such as through a high-speed network. The file system can also be redundant. In one embodiment, this redundancy is implemented through the use of multiple data disks for the file system. In such a redundant implementation, an object can be replicated across multiple disks any time the object is written to the file system. Such a file system, when viewed as a "black box," can be able to withstand failures of any of the disks and still provide access to a data item from any of the servers in the cluster.

A framework in accordance with the present invention, referred to as an "exactly-once" framework, can be built on the assumption that these objects kept in memory are always backed by a reliable, persistent storage mechanism. For example, there can be an object that represents a transaction log. Whenever a call is made to the object, the corresponding transaction log can be updated. This may include a call that either reads from, or writes to, a database. An object representing that transaction log can be sitting on one of the servers in the cluster, such as the host server. An exactly-once framework can ensure that, as long as at least one of the servers in the cluster is up and running, a server will be able to take over ownership of the log if another server fails.

There may be one object that represents a cache. Every time the cache is updated, the update can also be written back to persistent storage. When one of the servers needs to use a data item, that server can be required to go through this object. If the server hosting the object that represents the cache fails, the object can be resurrected on another server. The resurrected object can pull all the necessary information from persistent storage.

An exactly-once framework can act as a memory buffer for use by the cluster. The framework can provide a single cache representing data in the system that is backed by a reliable, persistent storage. Whenever data is read from the cache, the read can be done without needing to access persistent storage. When an update is written to cache, however, it can be necessary to write back through the persistent storage, such that the system can recover if there is a failure.

One important aspect of an exactly-once framework involves the way in which the approach is abstracted, which can vary depending upon the application and/or implementation. A new type of distributed object is created, such as can be referred to as an "exactly-once object." An exactly-once object can be, for example, a locally-cached copy of a data item in a file system, or the sole access point to such a data item for servers in a cluster. Underlying techniques for implementing this abstraction can also be important.

Systems of the present invention can utilize any of a number of methods useful for distributed consensus, such as a method using the afore-mentioned Paxos algorithm. Such an algorithm can be selected which provides an efficient way for multiple nodes and/or distributed nodes to agree on one value of an object. The algorithm can be chosen to work even if nodes fail and/or return during an agreement process.

A typical approach to network clustering utilizes reliable broadcasting, where every message is guaranteed to be delivered to its intended recipient, or at least delivered to every intended functioning server. This approach can make it very difficult to parallelize a system, as reliable broadcasting requires a recipient to acknowledge a message before moving on to the next message or recipient. A distributed algorithm utilizing multicasting may reduce the number of guarantees, as multicasting does not guarantee that all servers receive a message. Multicasting does simplify the approach such that the system can engage in parallel processing, however, as a single message can be multicast to all the cluster servers concurrently without waiting for a response from each server. A server that does not receive a multicast message can pull the information from the lead server, or another cluster server or network server, at a later time. As used herein, a network server can refer to any server on the network, whether in a hardware cluster, in a software cluster, or outside of any cluster.

An important aspect of an exactly-once architecture is that consensus difficulties are reduced. In accordance with the present invention, the performance of a distributed consensus implementation can be improved by using multicast messaging with a distributed consensus algorithm. This approach can allow for minimizing the message exchange and/or network traffic required for all the servers to agree.

When multicasting, one of several approaches can be taken. In a first approach, which may be referred to as "one-phase distribution," a lead server can multicast a message to all other servers on the network, such as may be used in a round of a Paxos algorithm, or used to state that a new host has been selected for an object. In this approach, the lead server only needs to send one message, which can be passed to any server available on the network. If a server is temporarily off the network, the server can request the identification of the new host after coming back onto the network.

Using another multicast approach, which may be referred to as a "two-phase distribution," the lead server can pre- select a host server using an appropriate algorithm. Before assigning an object to that host, however, the lead server can contact every other server in the cluster to determine whether the servers agree with the choice of the new host server. The lead server can contact each server by a point-to-point connection, or can send out a multicast request and then wait for each server to respond. If the servers do not agree on the selection of the host, the lead server can pre-select a new host using the algorithm. The lead server would then send out another multicast request with the identity of the newly pre-selected host in another round.

If every server agrees to the pre-selected host, the lead server can assign the object to the host server. The lead server can then multicast a commit message, informing the servers that the new change has taken effect and the servers should update their information accordingly.

An exactly-once framework can also utilize a "leasing" mechanism. In using such a mechanism, an algorithm can be used to get the cluster servers to agree on a lead server, such as by using distributed consensus. Once selected, that lead server can be responsible for assigning exactly-once objects to various servers in the cluster. The system can be set up such that the cluster servers will always agree on a new leader if an existing lead server fails.

While the lead server is active, the lead server can be aware of all the exactly-once objects that need to exist in the system. The lead server can decide which server should host each object, and can then "lease" that object to the selected server. When an object is leased to a server, that server can own or host the object for a certain period of time, such as for the duration of a lease period. The lead server can be configured to periodically renew these leases. This approach can provide a way to ensure that a server will not get its lease renewed if it fails or becomes disconnected in any way, or is otherwise not operating properly within the cluster.

Much of the problem with distributed systems under failure is that it is difficult to tell the difference between a server that has failed and one that is simply not responding. Any server that has been somehow cut off the network can no longer host an object. That server will still know, even though it is not available to the cluster, that it can drop its hosting of any object after the lease period. As the server is not available to the cluster, it will not get its lease renewed.

The lead server also knows that, if the lead server is unable to reach the host server within a certain amount of time, the host server will relinquish its ownership of the object. The lease period can be for any appropriate time, such as for a matter of seconds. The lease period can be the same for all objects in the cluster, or can vary between objects.

A system using an exactly-once architecture can also be tightened down. Operating systems often provide special machinery that is built closer to the hardware and can offer more control. One problem with this approach, however, is that it can be limited by the hardware available. For example, a hardware cluster of servers can have on the order of 16 servers. Because these systems require some tight hardware coupling, there can be limitations on the number of servers that can be included in the cluster.

An exactly-once framework, on the other hand, may be able to handle clusters much larger than these proprietary hardware clusters can handle. A framework can allow for some leveraging of the qualities of service that are available from one of the proprietary clusters, thereby allowing for a larger cluster. Differing qualities of service may include, for example, whether messages are sent by a reliable protocol, such as by point-to-point connections, or are sent by a less reliable but more resource-friendly protocol, such as multicasting. An advantage to using an exactly-once framework is the ability to balance scalability with fault tolerance, such that a user can adapt the system to the needs of a particular application.

Prior art systems such as hardware cluster machines can attempt high availability solutions by having (what appears to the cluster to be) a single machine backed up by a second machine. If the first machine goes down, there is a "buddy" that takes over, and any software that was running on the first machine is brought up on the second machine.

An exactly-once framework in accordance with the present invention can assign the lead server to a server in one of these hardware clusters, such that dealing with leader failure can become faster than dealing with it in a software cluster. This lead server can, however, dole out leases to servers whether those servers are in the hardware cluster or the software cluster. This arrangement may provide for faster lead server recovery, while allowing for a software cluster that is larger than, but still includes, the hardware cluster.

Figure 2:
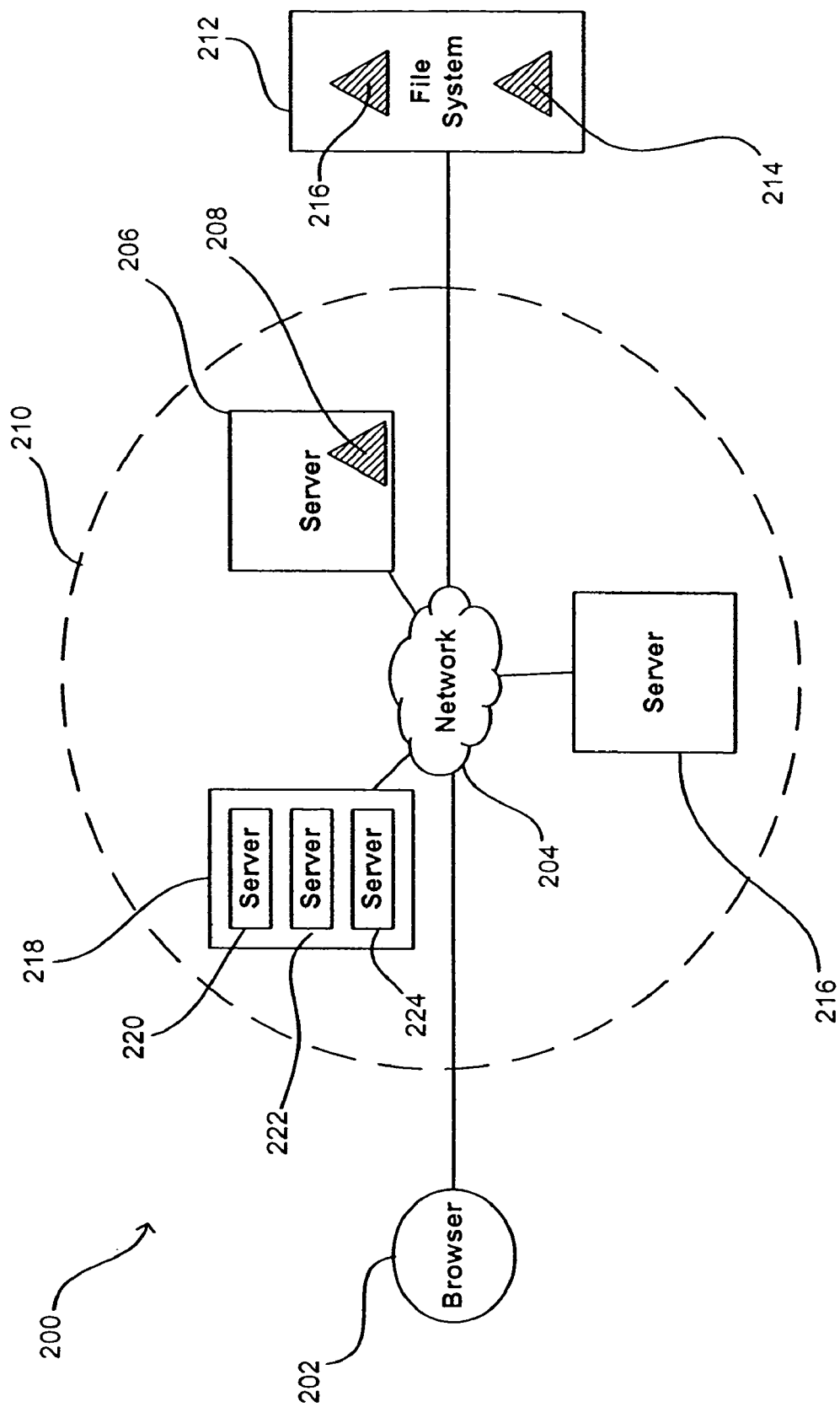
FIG. 2 is a diagram of another distributed object system in accordance with one embodiment of the present invention.

One such system 200 is shown in FIG. 2. A hardware cluster 218 can comprise a single machine containing multiple servers 220, 222, 224. The hardware cluster can be used to choose a lead server 220 from among the servers on that machine, such as may improve efficiency. Once a lead server 220 is selected, the lead server can select a host 206 for an object 214 in a file system 212, which can be located inside or outside of the software cluster 210. The file system 214 itself can replicate the object 214 to a second object 216 on another disk of the file system, such as may provide persistence. The object 214 can be pulled from the file system 212 by the new host 206 with a copy 208 of the object cached on the host 206. When a request is received from a browser or client 202 to a server through the network 204, such as servers 206, 216, and 220, that server will know to contact host server 206 if the server needs access to the cached copy of the object 208.

Figure 5:
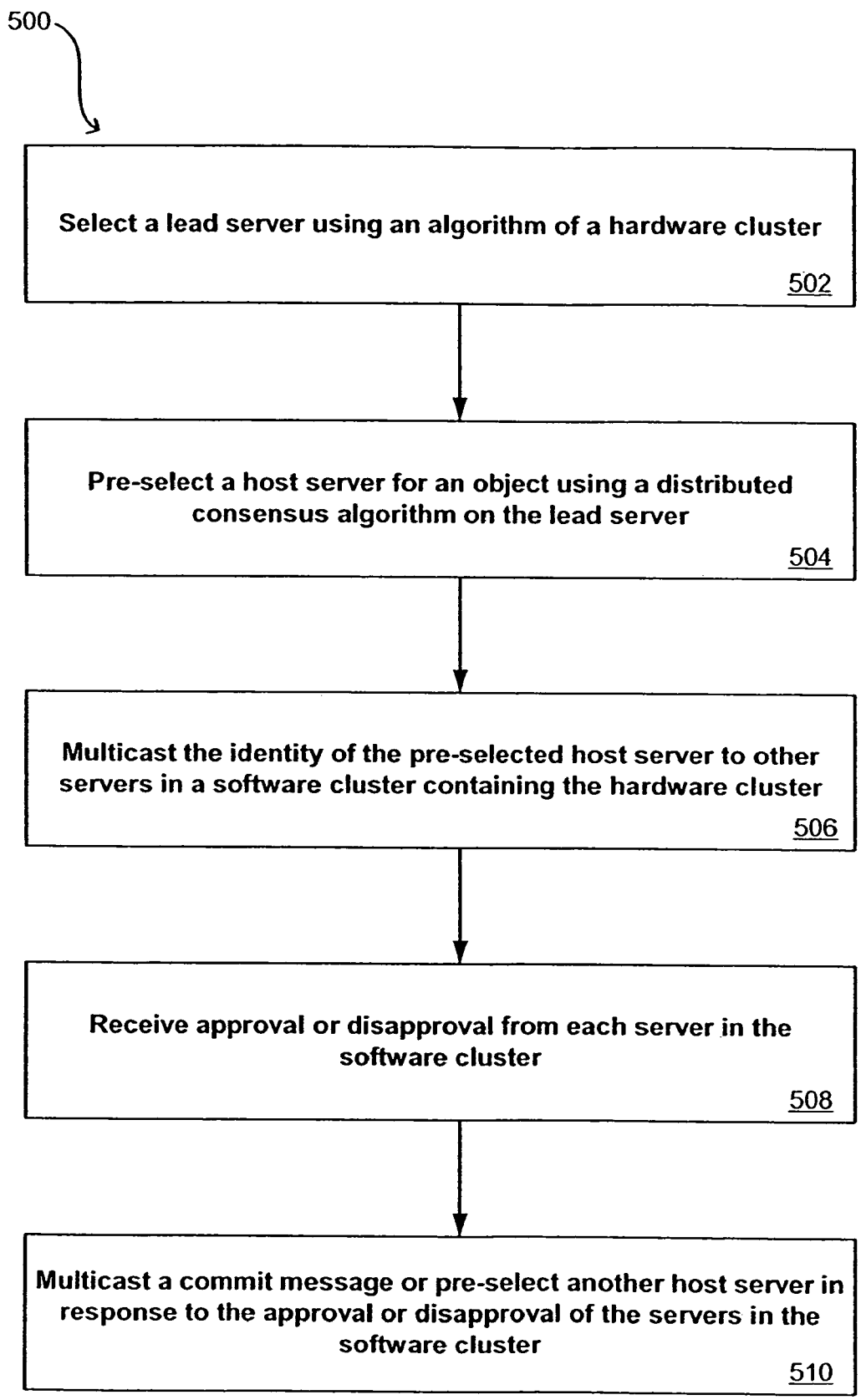
FIG. 5 is a flowchart of a method for utilizing a lead server in accordance with the present invention.

One method 500 for using such a system is shown in FIG. 5. The lead server is selected using an algorithm of a hardware cluster 502. This algorithm may be, for example, a proprietary algorithm of the hardware cluster machine, or may be a distributed consensus algorithm requiring consensus over the hardware cluster servers only. A host server can then be pre-selected using a distributed consensus algorithm with the lead server 504, such as a Paxos algorithm. The identity of the pre-selected host can then be multicast to the other servers in a software cluster containing the hardware cluster 506. The lead server can receive approval or disapproval from each server that is presently operational and connected to the cluster 508. If the servers approve the pre-selected host server, a commit message is multicast to the cluster servers informing the servers that the pre-selected host now hosts the item; otherwise, if the servers do not approve a new host is pre-selected and the process begins again 510.

An exactly-once framework can be used, for example, to handle transaction logs or caching. Such a framework can also be used, for example, to define an administration server as an exactly-once object and lease the administration server such that the administration server never goes down.

Figure 6:
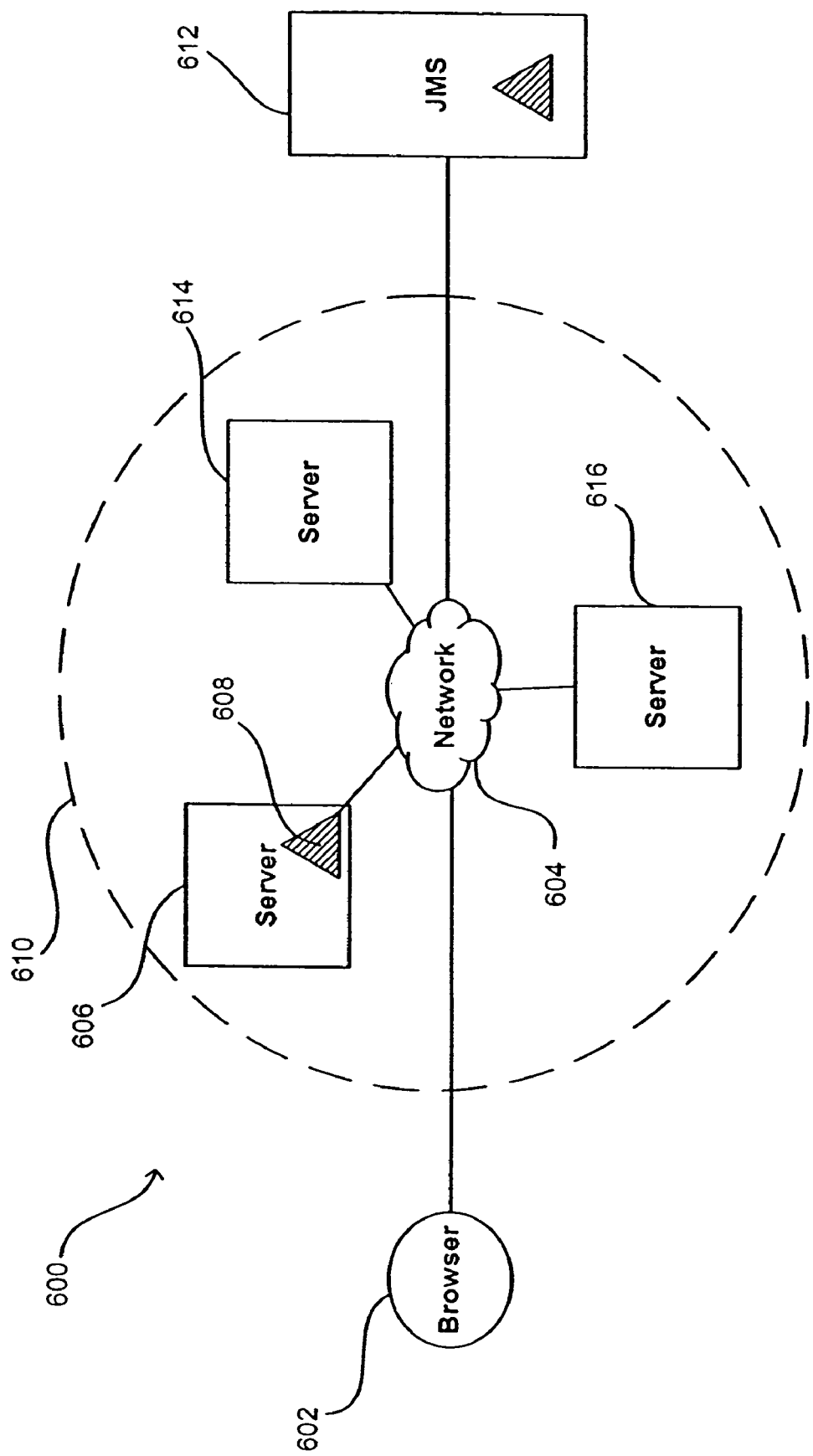
FIG. 6 is a diagram of JMS message store system in accordance with one embodiment of the present invention.

FIG. 6 shows another example of a cluster system 600 in accordance with the present invention, where an object 608 acts as a message store for Java Message Service (JMS) 612. All servers 606, 614, 616 in the cluster 610 can use JMS, but they must send messages to the message store 608 and pick up any messages from the message store 608 through the network 604. A host server 606 of the servers in the cluster 610 will "own" or "host" the message store 608. A client or browser 602 can make a request to a network 604 that is directed to server 616 in cluster 610. That server 616 can access JMS only by sending a message to the message store 608 on the host server 606 through the network 604.

Figure 7:
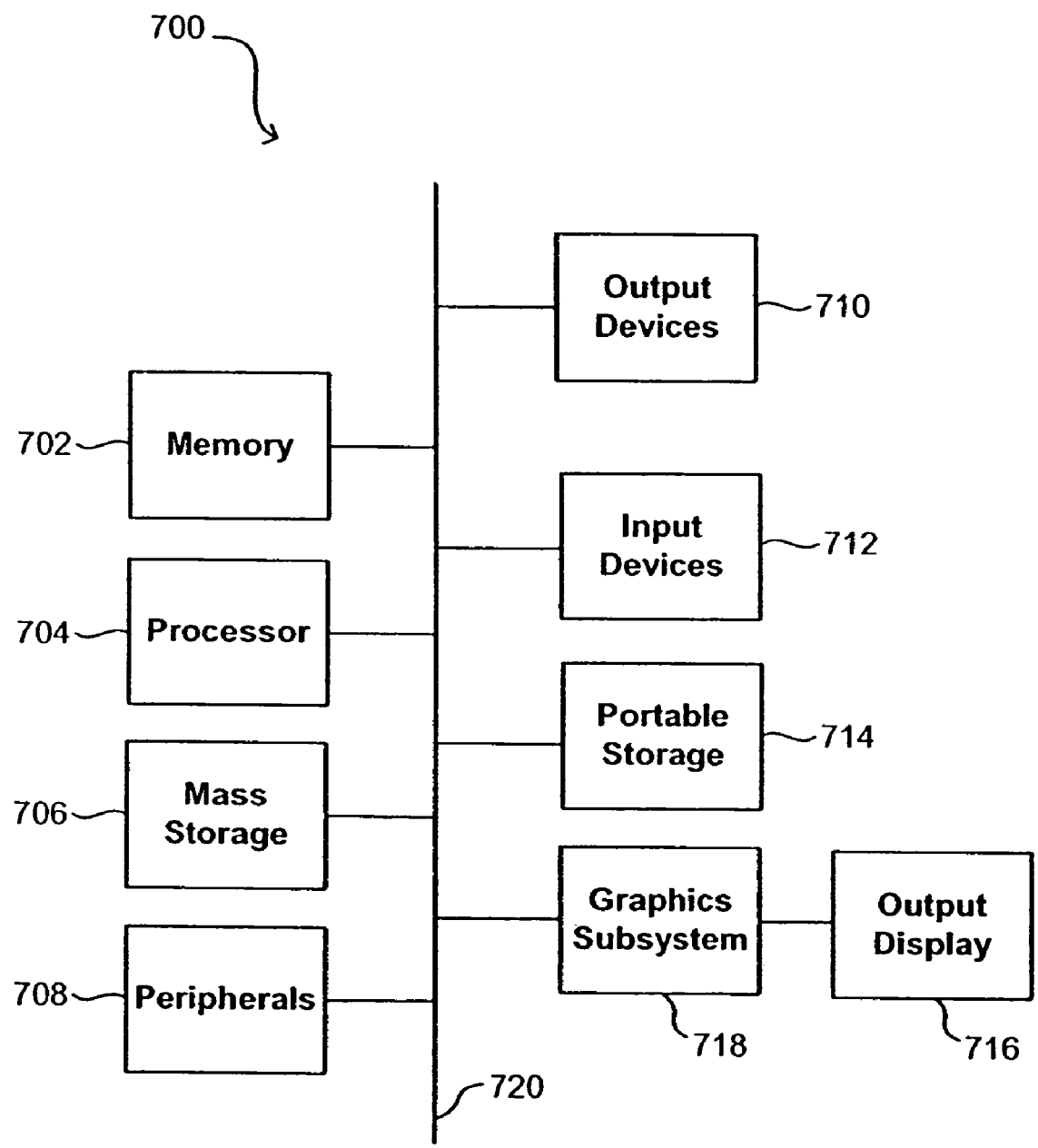
FIG. 7 is a block diagram depicting components of a computing system that can be used in accordance with the present invention.

FIG. 7 illustrates a block diagram 700 of a computer system which can be used for components of the present invention or to implement methods of the present invention. The computer system of FIG. 7 includes a processor unit 704 and main memory 702. Processor unit 704 may contain a single microprocessor, or may contain a plurality of microprocessors for configuring the computer system as a multiprocessor system. Main memory 702 stores, in part, instructions and data for execution by processor unit 704. If the present invention is wholly or partially implemented in software, main memory 702 can store the executable code when in operation. Main memory 702 may include banks of dynamic random access memory (DRAM), high speed cache memory, as well as other types of memory known in the art.

The system of FIG. 7 further includes a mass storage device 706, peripheral devices 708, user input devices 712, portable storage medium drives 714, a graphics subsystem 718, and an output display 716. For purposes of simplicity, the components shown in FIG. 7 are depicted as being connected via a single bus 720. However, as will be apparent to those skilled in the art, the components may be connected through one or more data transport means. For example, processor unit 704 and main memory 702 may be connected via a local microprocessor bus, and the mass storage device 706, peripheral devices 708, portable storage medium drives 714, and graphics subsystem 718 may be connected via one or more input/output (I/O) buses. Mass storage device 706, which may be implemented with a magnetic disk drive, optical disk drive, as well as other drives known in the art, is a non-volatile storage device for storing data and instructions for use by processor unit 704. In one embodiment, mass storage device 706 stores software for implementing the present invention for purposes of loading to main memory 702.

Portable storage medium drive 714 operates in conjunction with a portable non-volatile storage medium, such as a floppy disk, to input and output data and code to and from the computer system of FIG. 7. In one embodiment, the system software for implementing the present invention is stored on such a portable medium, and is input to the computer system via the portable storage medium drive 714. Peripheral devices 708 may include any type of computer support device, such as an input/output (I/O) interface, to add additional functionality to the computer system. For example, peripheral devices 708 may include a network interface for connecting the computer system to a network, as well as other networking hardware such as modems, routers, or other hardware known in the art.

User input devices 712 provide a portion of a user interface. User input devices 712 may include an alphanumeric keypad for inputting alpha-numeric and other information, or a pointing device, such as a mouse, a trackball, stylus, or cursor direction keys. In order to display textual and graphical information, the computer system of FIG. 7 includes graphics subsystem 718 and output display 716. Output display 716 may include a cathode ray tube (CRT) display, liquid crystal display (LCD) or other suitable display device. Graphics subsystem 718 receives textual and graphical information, and processes the information for output to display 716. Additionally, the system of FIG. 7 includes output devices 710. Examples of suitable output devices include speakers, printers, network interfaces, monitors, and other output devices known in the art.

The components contained in the computer system of FIG. 7 are those typically found in computer systems suitable for use with certain embodiments of the present invention, and are intended to represent a broad category of such computer components known in the art. Thus, the computer system of FIG. 7 can be a personal computer, workstation, server, minicomputer, mainframe computer, or any other computing device. Computer system 700 can also incorporate different bus configurations, networked platforms, multi-processor platforms, etc. Various operating systems can be used including Unix, Linux, Windows, Macintosh OS, Palm OS, and other suitable operating systems.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for managing objects on a network, comprising:
   a plurality of network servers, each network server adapted to communicate with a network data source, wherein said plurality of network servers include a distributed consensus algorithm, the distributed consensus algorithm comprising rounds of messages between a lead server and said plurality of network servers, the rounds continuing until a majority of said plurality of network servers agrees on a host server; and
   the host server assigned a data object, the data object related to a data item in the network data source, wherein any of said plurality of network servers needing to access the data item can access the data object on the host server.

2. A system according to claim 1, wherein said network servers are selected from the group consisting of hardware cluster servers and software cluster servers.

3. A system according to claim 1, wherein the host server contains a data object comprising a copy of data from the network data source.

4. A system according to claim 1, wherein the host server contains a data object serving as the sole access point for the data item in the network data source.

5. A system according to claim 1, wherein said data item is a transaction log.

6. A system according to claim 1, wherein said distributed consensus algorithm is a Paxos algorithm.

7. A system for managing objects on a network, comprising:
   a file system containing at least one copy of a data item;
   a plurality of servers in communication with the file system;
   a hardware cluster containing hardware cluster servers located in said plurality of servers, said hardware cluster containing a distributed consensus algorithm for selecting a lead server from among said hardware cluster servers; and
   a host server in said plurality of servers, said host server containing a local copy of the data item, said host server adapted to provide access to the local copy to any of said plurality of servers and update the copy of the data item in the file system any time an update is made to the local copy.

8. A system according to claim 7, wherein said host server is in said hardware cluster.

9. A method for assigning ownership of an object on a network, comprising:
   selecting a host server from among a plurality of network servers using a distributed consensus algorithm stored on a hardware cluster;
   assigning a data object to the host server, the host server assigned to provide sole access to a data object on the network;
   pulling a copy of a data object from a file system to the host server; and
   notifying other network servers that the host server contains a copy of the data object to be used in processing network requests.

* * * * *